United States Patent
Kurz et al.

(10) Patent No.: US 7,441,229 B2
(45) Date of Patent: Oct. 21, 2008

(54) MODEL DRIVEN PORTLET DEVELOPMENT METHOD, SYSTEM AND PROGRAM PRODUCT

(75) Inventors: Genevieve B. Kurz, St. Louis, MO (US); Andrew H. Schuh, Thornhill (CA); Bradley S. Tagg, Chester, NY (US); James S. Young, Scarborough (CA)

(73) Assignee: International Business Machines Corporations, Armonk, NY (US)

( * ) Notice: Subject to any disclaimer, the term of this patent is extended or adjusted under 35 U.S.C. 154(b) by 622 days.

(21) Appl. No.: 10/776,902

(22) Filed: Feb. 10, 2004

(65) Prior Publication Data

US 2005/0177815 A1    Aug. 11, 2005

(51) Int. Cl.
G06F 9/45 (2006.01)
(52) U.S. Cl. ...................................... 717/104
(58) Field of Classification Search .................. 717/104
See application file for complete search history.

(56) References Cited

U.S. PATENT DOCUMENTS

| | | |
|---|---|---|
| 6,101,325 A | 8/2000 | Flaat |
| 6,327,628 B1 | 12/2001 | Anuff et al. |
| 7,062,511 B1 * | 6/2006 | Poulsen .................. 707/104.1 |
| 2002/0023147 A1 | 2/2002 | Kovacs et al. |
| 2002/0029296 A1 | 3/2002 | Anuff et al. |
| 2002/0095655 A1 | 7/2002 | Kim et al. |
| 2002/0129330 A1 | 9/2002 | Shiu |
| 2002/0169852 A1 * | 11/2002 | Schaeck ...................... 709/218 |
| 2003/0018959 A1 | 1/2003 | Wallman et al. |
| 2003/0088617 A1 | 5/2003 | Clark et al. |
| 2003/0097286 A1 | 5/2003 | Skeen |
| 2003/0167315 A1 * | 9/2003 | Chowdhry et al. .......... 709/218 |
| 2004/0183831 A1 * | 9/2004 | Ritchy et al. ................. 345/762 |
| 2004/0230947 A1 * | 11/2004 | Bales et al. .................. 717/110 |
| 2005/0071553 A1 * | 3/2005 | Jones et al. .................. 719/328 |
| 2005/0132023 A1 * | 6/2005 | Cazzolla et al. ............. 709/219 |
| 2006/0053376 A1 * | 3/2006 | Ng et al. ...................... 715/742 |

* cited by examiner

*Primary Examiner*—John Chavis
(74) *Attorney, Agent, or Firm*—Anna Linne; Hoffman Warnick LLC

(57) ABSTRACT

Under the present invention desired portlet behaviors are embodied as portlet patterns. When a developer wishes to create a new portlet for a portal page, the developer will select a presentation template, select one or more portlet patterns and input values for the selected portlet patterns. Thereafter, the portlet will be encoded by binding the values to the selected patterns according to the presentation template. Once encoded, the portlet will be bound to a portal server catalog corresponding to the portal page. The binding to the portal server catalog allows the portlet to be visible to end users visiting the portal page. Then, if an end user selects the portlet, an instance thereof will be created by an instantiator portlet. Any underlying functions of the portlet can then be carried out by the instantiator portlet.

19 Claims, 6 Drawing Sheets

TEMPLATE "A"

<td>Content:</td><td>[CP:Graph X]</td>

<td>Location:</td><td>[CP:FileName Y]</td>

MODEL DRIVEN PORTLET DEVELOPMENT METHOD, SYSTEM AND PROGRAM PRODUCT

FIELD OF THE INVENTION

In general, the present invention provides a model driven portlet development method, system and program product. Specifically, the present invention provides a way for portlets to be efficiently encoded and instantiated.

BACKGROUND OF THE INVENTION

Web portal pages have become an increasingly popular means of delivering aggregated content to computer users. Typically, a portal page is created on a portal server by a portal program (e.g., WebSphere Portal Server from International Business Machines Corp. of Armonk, N.Y.). As known, a portal page includes sections or visual portlets that each contain particular portal content arranged in a certain format (e.g., look and feel). For example, referring to FIG. 1, a portal page 10 could be established that has sections for Stocks 12A, Breaking News from AP 12B and Technology News from Reuters 12C, as well as various advertisements 14A-C. When page 10 is requested by an end user, the portal program would obtain the desired portal content from the appropriate content providers. Once obtained, the portal content would be aggregated, and then displayed in the appropriate sections as portal page 10. Thus, the provider of a portal page need not maintain the actual content itself. Rather, it need only obtain the requested content from the appropriate sources upon request.

This advancement of portal technology is not only being used for the creation of personalized "home" pages by individual web users (e.g., MY.YAHOO.COM), but is also being implemented by many organizations (e.g., businesses) as a more efficient way to deliver content to end users in a certain format (e.g., look and feel). For example, a particular organization such as a bank might maintain a portal-based web site that includes portlets for a stock ticker, financial news, a mortgage calculator, etc. These portlets could formatted to have certain characteristics (e.g., color patterns, stylization's, etc.) that are unique to the particular organization.

Unfortunately, as convenient as portal technology can be, it is not without drawbacks. For example, whenever an organization wishes to add a new function to its portal page, a new portlet must be created. Since each portlet essentially functions as an application, each new portlet must typically go through an extended development and deployment process. This has been the case even though there may be a high degree of commonality between portlets. That is, a number of portlets may actually perform the same function, just on different sets of data. For example, if portlet "A" provides sports news, while portlet "B" provides business news, the underlying function of both portlets would be to retrieve a certain type of data from a certain source. As such, there might not be a need to repeat the lengthy development and deployment process for portlet "B" once portlet "A" has been deployed. Even if portlet templates are used to create duplicates of a certain portlet, each duplicate is still considered a separate application that must endure the development and deployment process.

In view of the foregoing, there exists a need for a more model driven portlet development process. To this extent, a need exists for portlet behaviors to be embodied as portlet patterns to which actual values can be bound, and instances of portlets can be created according to presentation templates.

SUMMARY OF THE INVENTION

In general, the present invention provides a model drive portlet development method, system and program product. Specifically, under the present invention desired portlet behaviors are embodied as portlet patterns. When a developer wishes to create a new portlet for a portal page, the developer will select a presentation template, select one or more portlet patterns, and input values for the selected portlet patterns. Thereafter, the portlet will be encoded by binding the values to the selected patterns according to the presentation template. Once encoded, the portlet will be bound to a portal server catalog corresponding to the portal page. The binding to the portal server catalog allows the portlet to be visible to end users visiting the portal page. Then, if an end user selects the portlet, an instance thereof will be created by an instantiator portlet. Any underlying functions of the portlet can then be carried out by the instantiator portlet.

A first aspect of the present invention provides a model driven portlet development method, comprising: providing a set of portlet patterns; encoding a portlet by binding values to at least one of the set of portlet patterns; binding the portlet to a portal server catalog; and creating an instance of the portlet using an instantiator portlet running on a portal server.

A second aspect of the present invention provides a model driven portlet development method, comprising: receiving a selection of a presentation template; receiving a selection of at least one portlet pattern from a set of portlet patterns; receiving values for the at least one portlet pattern; encoding a portlet by binding the values to the at least one portlet pattern according to the presentation template; binding the portlet to a portal server catalog; and creating an instance of the portlet using an instantiator portlet.

A third aspect of the present invention provides a model driven portlet development system, comprising: a portlet configuration system for selecting a presentation template, selecting at least one portlet pattern from a set of portlet patterns, and inputting values for the at least one portlet pattern; a portlet encoding system for encoding a portlet by binding the values to the at least one portlet pattern according to the presentation template; a portlet catalog system for binding the portlet to a portal server catalog; and an instantiator portlet for creating an instance of the portlet upon selection of the portlet on a portal page.

A fourth aspect of the present invention provides a program product stored on a recordable medium for model driven portlet development, which when executed, comprises: program code for configuring a portlet, wherein the program code for configuring the portlet provides a set of interface pages to select a presentation template, select at least one portlet pattern from a set of portlet patterns, and input values for the at least one portlet pattern; program code for encoding a portlet by binding the values to the at least one portlet pattern according to the presentation template; program code for binding the portlet to a portal server catalog; and program code for creating an instance of the portlet upon selection of the portlet on a portal page.

Therefore, the present invention provides a model drive portlet development method, system and program product.

BRIEF DESCRIPTION OF THE DRAWINGS

These and other features of this invention will be more readily understood from the following detailed description of the various aspects of the invention taken in conjunction with the accompanying drawings in which.

Figure 1:
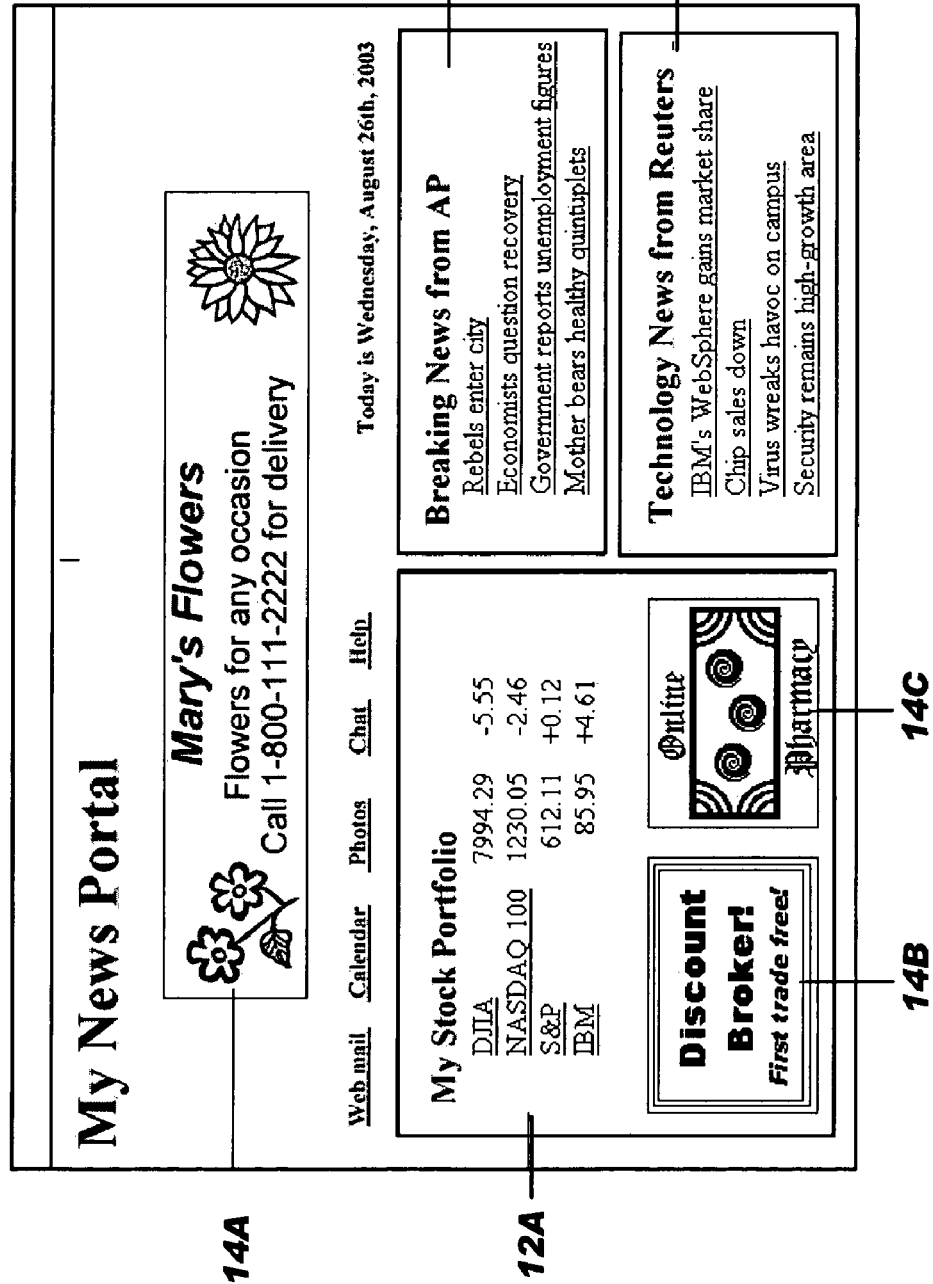
FIG. 1 depicts an illustrative portal page.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a model drive portlet development method, system and program product. Specifically, under the present invention desired portlet behaviors are embodied as portlet patterns. When a developer wishes to create a new portlet for a portal page, the developer will select a presentation template, select one or more portlet patterns, and input values for the selected portlet patterns. Thereafter, the portlet will be encoded by binding the values to the selected patterns according to the presentation template. Once encoded, the portlet will be bound to a portal server catalog corresponding to the portal page. The binding to the portal server catalog allows the portlet to be visible to end users visiting the portal page. Then, if an end user selects the portlet, an instance thereof will be created by an instantiator portlet. Any underlying functions of the portlet can then be carried out by the instantiator portlet.

Figure 2:
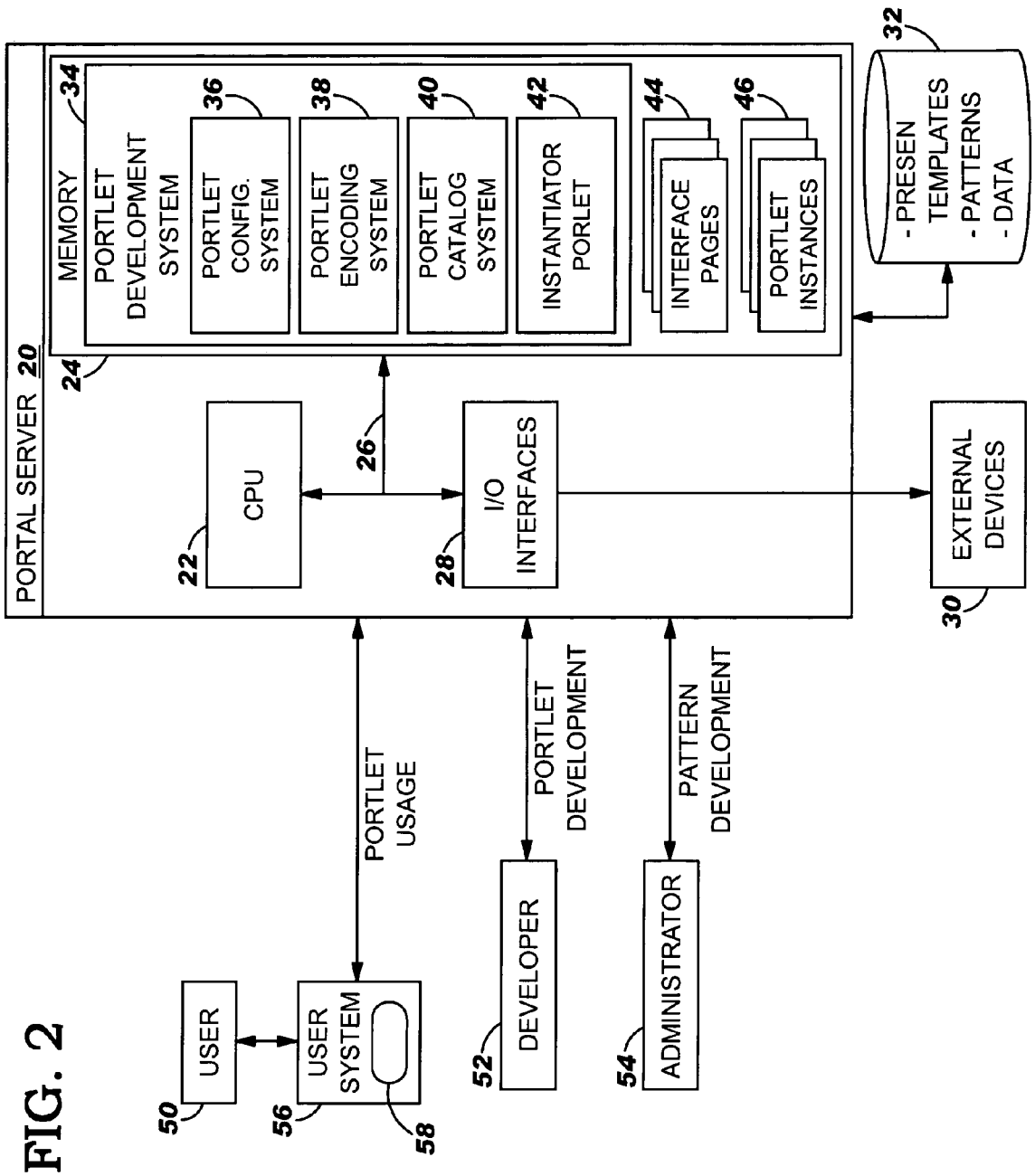
FIG. 2 depicts a model drive portlet development system according to the present invention.

Referring now to FIG. 2, an illustrative model drive portlet development system according to the present invention is shown. In general, under the portlet development process of the present invention, there are typically three types of "parties." Namely, end user 50, developer 52, and administrator 54. The roles of these three parties will be further described below, but in general, developer 52 develops a portlet for use by end user 50 using patterns provided by administrator 54. In a typical embodiment, end user 50 communicates with portal server 20 over a network using browser 58 on user system 56. User system 56 is intended to represent any type of computerized system capable of such communication such as a personal computer, a laptop, a handheld device, etc.

In any event, the network over which the communication occurs could be any type of network such as the Internet, a local area network (LAN), a wide area network (WAN), a virtual private network (VPN), etc. Moreover, communication between user system 56 and portal server 20 could occur via a direct hardwired connection (e.g., serial port), or via an addressable connection that may utilize any combination of wireline and/or wireless transmission methods. Any conventional network connectivity, such as Token Ring, Ethernet, WiFi or other conventional communications standards could be utilized. Moreover, connectivity could be provided by conventional TCP/IP sockets-based protocol. In a typical embodiment user system 56 is a client or that utilizes an Internet service provider to establish connectivity to portal server 20.

As further depicted, portal server 20 generally comprises central processing unit (CPU) 22, memory 24, bus 26, input/output (I/O) interfaces 28, external devices/resources 30 and storage unit 32. CPU 22 may comprise a single processing unit, or be distributed across one or more processing units in one or more locations, e.g., on a client and computer system. Memory 24 may comprise any known type of data storage and/or transmission media, including magnetic media, optical media, random access memory (RAM), read-only memory (ROM), a data cache, etc. Moreover, similar to CPU 22, memory 24 may reside at a single physical location, comprising one or more types of data storage, or be distributed across a plurality of physical systems in various forms.

I/O interfaces 28 may comprise any system for exchanging information to/from an external source. External devices/resources 30 may comprise any known type of external device, including speakers, a CRT, LCD screen, handheld device, keyboard, mouse, voice recognition system, speech output system, printer, monitor/display, facsimile, pager, etc. Bus 26 provides a communication link between each of the components in portal server and likewise may comprise any known type of transmission link, including electrical, optical, wireless, etc.

Storage unit 32 can be any system (e.g., database) capable of providing storage for information under the present invention. Such information could include, for example, presentation templates, patterns, data values, etc. As such, storage unit 32 could include one or more storage devices, such as a magnetic disk drive or an optical disk drive. In another embodiment, storage unit 32 includes data distributed across, for example, a local area network (LAN), wide area network (WAN) or a storage area network (SAN) (not shown). Furthermore, although not shown, additional components, such as cache memory, communication systems, system software, etc., may be incorporated into portal server. In addition, it should be appreciated that although not shown, user system 26 would likely include computerized components similar to portal server 20. Such components have not been shown for brevity purposes. Furthermore, although developer 52 and administrator 54 are shown directly accessing portal server 20, this need not be the case. Rather, either (or both) developer 52 or administrator 54 could operate a separate computerized system that communicates with portal server 20 (e.g., over a network).

In any event, shown in memory 24 of portal server 20 is portlet development system 34, which could be part of a portal program such as WebSphere Portal Server. As further shown, portal development system 34 includes portlet configuration system 36, portlet encoding system 38, portlet catalog system 40 and instantiator portlet 42. Under the present invention, portlet development system 34 will be used by developer 52 to develop portlets for a portal page in a model driven environment. For example, assume that developer 52 is attempting to create a new function/portlet for a portal page (e.g., portal page 10 of FIG. 1) that will retrieve a certain piece of content (e.g., a graph) from a certain file. In this case, portlet configuration system 36 will first provide developer 52 with a set (e.g., one or more) of interface pages 44 that allows developer 52 to designate the configuration details of the new portlet. To this extent, portlet configuration system 34 can be likened to a "wizard" that walks developer 52 through the steps of developing the new portlet. In a typical embodiment portlet configuration system 36 provides one or more interface pages 44 that allows developer 52 to select a presentation template for the new portlet, select one or more patterns for the new function and input values for the selected pattern.

In selecting the presentation template, developer 32 could select from a library of preexisting presentation templates. For example, it could be the case that developer 52 is developing a portal page for a customer that desires a certain "look and feel." In this case, one or more presentation templates may have already been supplied and could be stored in storage unit 32 or the like. In this case, developer 52 would simply select the applicable presentation template. Along these lines, developer 52 could be provided with a set (i.e., one or more) of links for navigating about and viewing the various preexisting presentation templates. In another embodiment, portlet configuration system 36 could provide developer 52 with a set of interface pages 44 that allows developer 42 to customize his/her own presentation template (and possibly store the same in storage unit 32 for later use).

Regardless of the manner in which the presentation template is selected, portlet configuration system 36 will also provide one or more interface pages 44 for developer 52 to select at least portlet pattern from a set (i.e., one or more) of portlet patterns. Under the present invention, each pattern represents one or more desired functions for the new portlet, and is what allows the development process to be "model driven." For example, separate patterns could be provided to, among other things, display content from a file source, display content from a federated (e.g., shared) data source, submit data, and provide two way interaction. It should be noted that a single pattern might incorporate one or more other patterns (referred to as sub-patterns). For example, the submit data pattern would likely include a sub-pattern for retrieving a "submit form" from a certain file or data source, as well a sub-pattern for directing the submitted information to a particular destination. In addition, the two way interaction pattern would likely incorporate the submitted pattern, as well as a pattern for providing a response or confirmation.

In general, the patterns are provided by administrator 54 prior to the development process. In addition, as will be further described below, the patterns can be realized using common portlet markup language (CPML) tags, or a table-based system. In any event, portlet configuration system 36 typically allows developer 52 to select from the available patterns for the function he/she desires. In the example above, a pattern would be selected that corresponds to the function of retrieving content from a particular location. This would like resemble a display content from a file source pattern.

In selecting the applicable pattern, several options are possible. For example, developer 52 could select from a list of patterns. Alternatively, developer 52 could conduct a query using keywords (e.g., "retrieval") corresponding to the applicable pattern. Regardless, using preexisting patterns provides several advantages. Primarily, developer 52 would be reusing a pattern that has already gone through a development and deployment process. Accordingly, unlike previous systems, the new portlet being created by developer 52 would not have to go through the same process. In an alternative embodiment, developer 52 could be provided with "permission" to create/customize new patterns. Whenever new patterns are created (by developer 52 or administrator 54), an expansion or the markup language or the table would be needed.

Assuming that developer 52 has selected the pattern for the new content retrieval portlet, developer 52 will then use a set of interface pages 44 for inputting data values that make the pattern specific to the needed function. For example, if developer 52 was creating a portlet to certain display information from a certain file, the pattern would resemble "retrieve - - - from file - - - ." Developer 52 would need to input the data values specifying the specific content to retrieve from the particular file. For example, if developer 52 wishes to display Graph Z from File Y, developer 52 could input the values of Graph X and File Y so that the pattern (when bound to the values) would read "retrieve Graph X from File Y."

Figure 3:
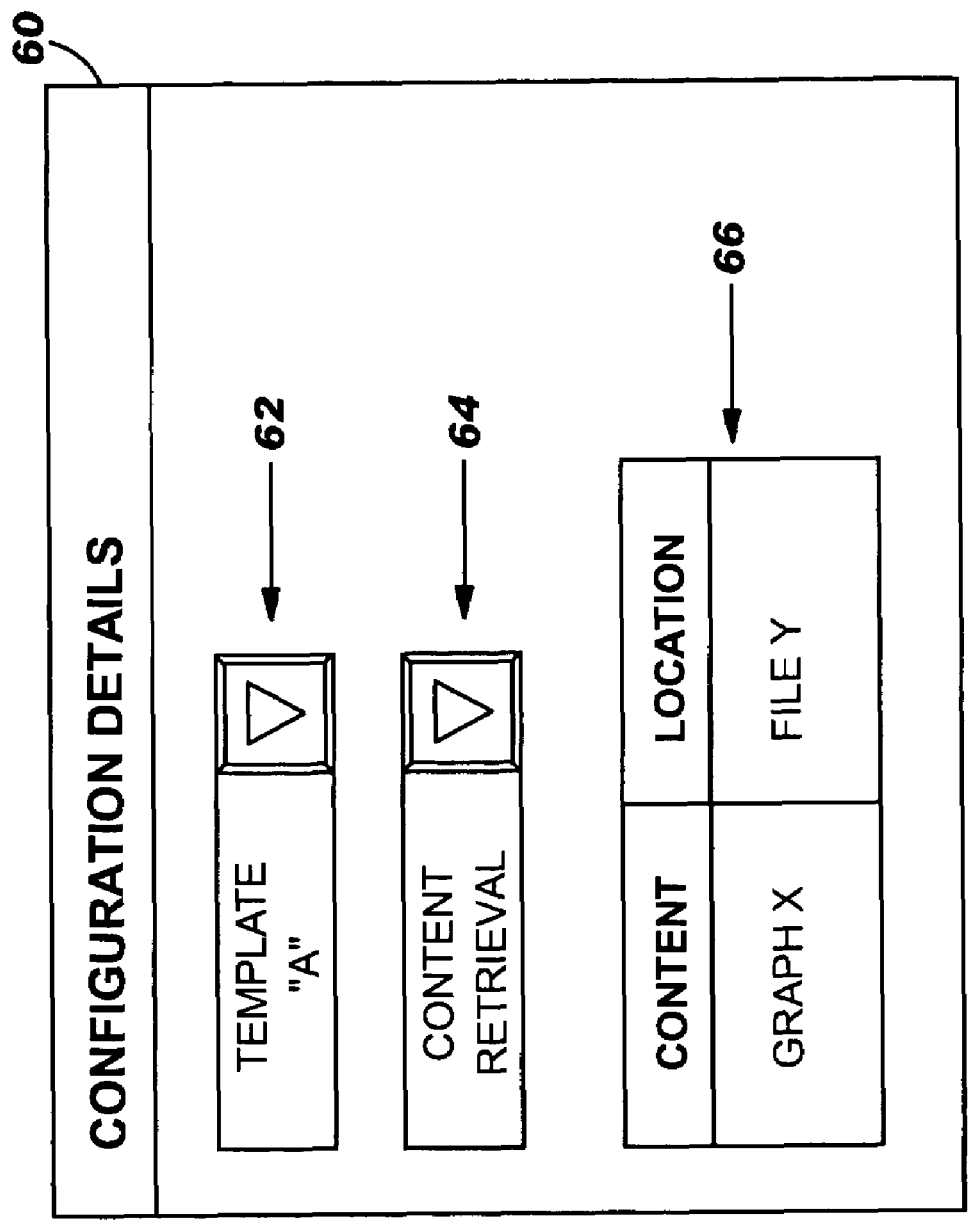
FIG. 3 depicts an illustrative interface page for designating configuration details according to the present invention.

Referring to FIG. 3, an illustrative interface page 60 for designating the configuration details is shown. As depicted, interface page 60 could provide drop down menus 62 and 64 for selecting a presentation template (e.g., Template "A") and a pattern (e.g., Content Retrieval), respectively. Interface page 60 could further includes a table 66 for developer 52 to input values for the selected pattern. In viewing table 66, it can be seen that developer 52 (FIG. 2) has input specific values for "Content" and "Location." These values mean that when end user 50 attempts to access the corresponding portlet, Graph X will be retrieved from File Y. It should be understood that interface page 60 is intended to be illustrative only. To this extent, the presentation template, the pattern and the values need not be selected/input using a single interface page 60. Moreover, although FIG. 3 depicts drop down menus 62 and 64 and table 66, any mechanism for designating these configuration details could actually be provided. It should also be noted that table 66 shown in FIG. 3 need not have an impact on whether the selected pattern is later realized using CPML or a table. It should also be appreciated that although not shown, other configuration details could be designated by developer 52. For example, developer 52 could select a window state (minimized, maximized, etc.) for the portlet. That is, the portlet would be displayed to end user 50 in the selected window state.

Referring back to FIG. 2, in providing developer 52 with set of interface pages 44 to configure the new portlet, portlet configuration system 36 could also have a help module to assist in the development process. In any event, once developer 52 has provided all necessary configuration details (presentation template, pattern(s) and values), the details could be "saved" as a configuration file that is passed to portlet encoding system 38, which will encode the portlet by binding the inputted values to the selected pattern according to the presentation template.

Figure 4:
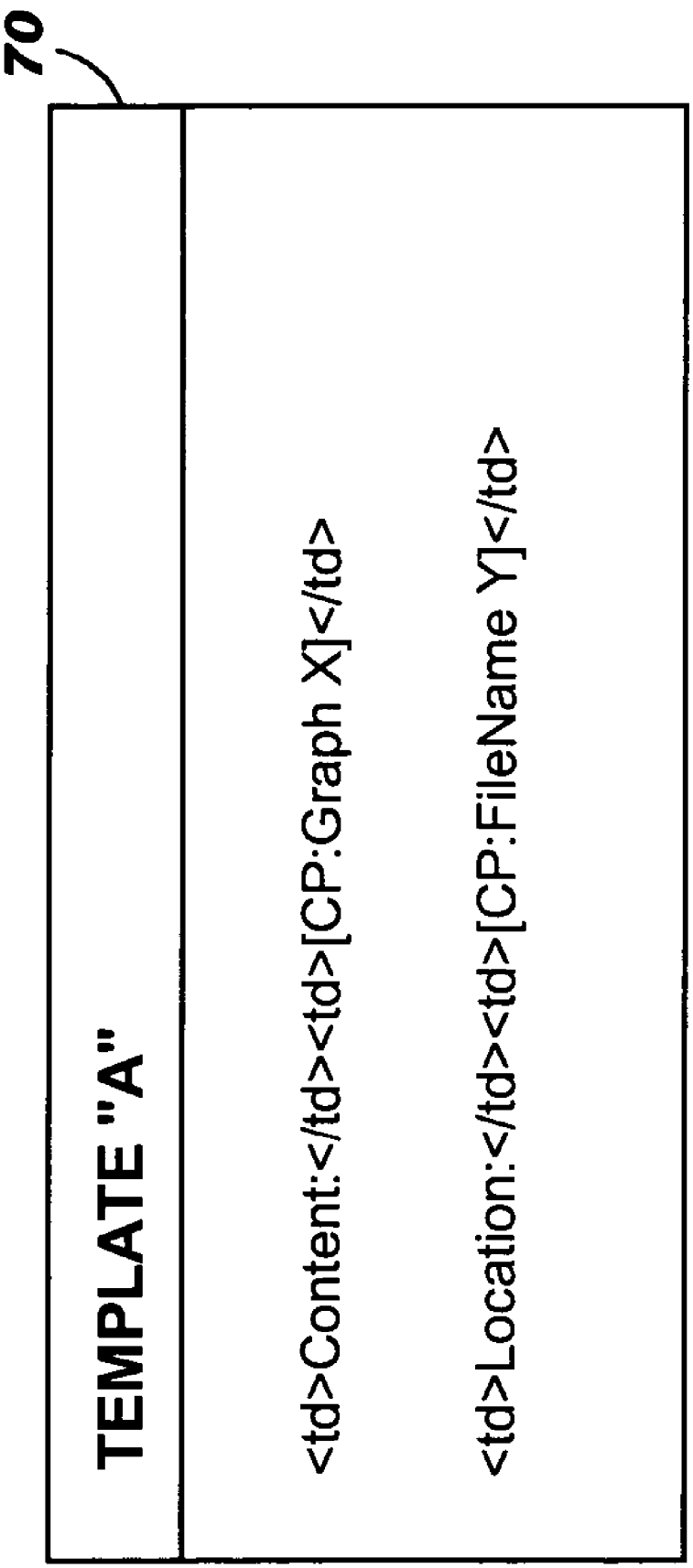
FIG. 4 depicts an illustrative portlet encoded according to the present invention.

Specifically, referring to FIG. 4, a portion of an illustrative portlet 70 as encoded by portlet encoding system 38 (FIG. 2) using CPML tags according to a selected presentation template is shown. As depicted, CPML tags have been provided for the values input by developer 52. For example, for Graph X, the CPML tag is "CP:GraphX," and for File Y, the CPML tag is "CP:FilenameY." To accommodate new patterns, administrator 54 (FIG. 2) would need only expand the CPML language.

Figure 5:
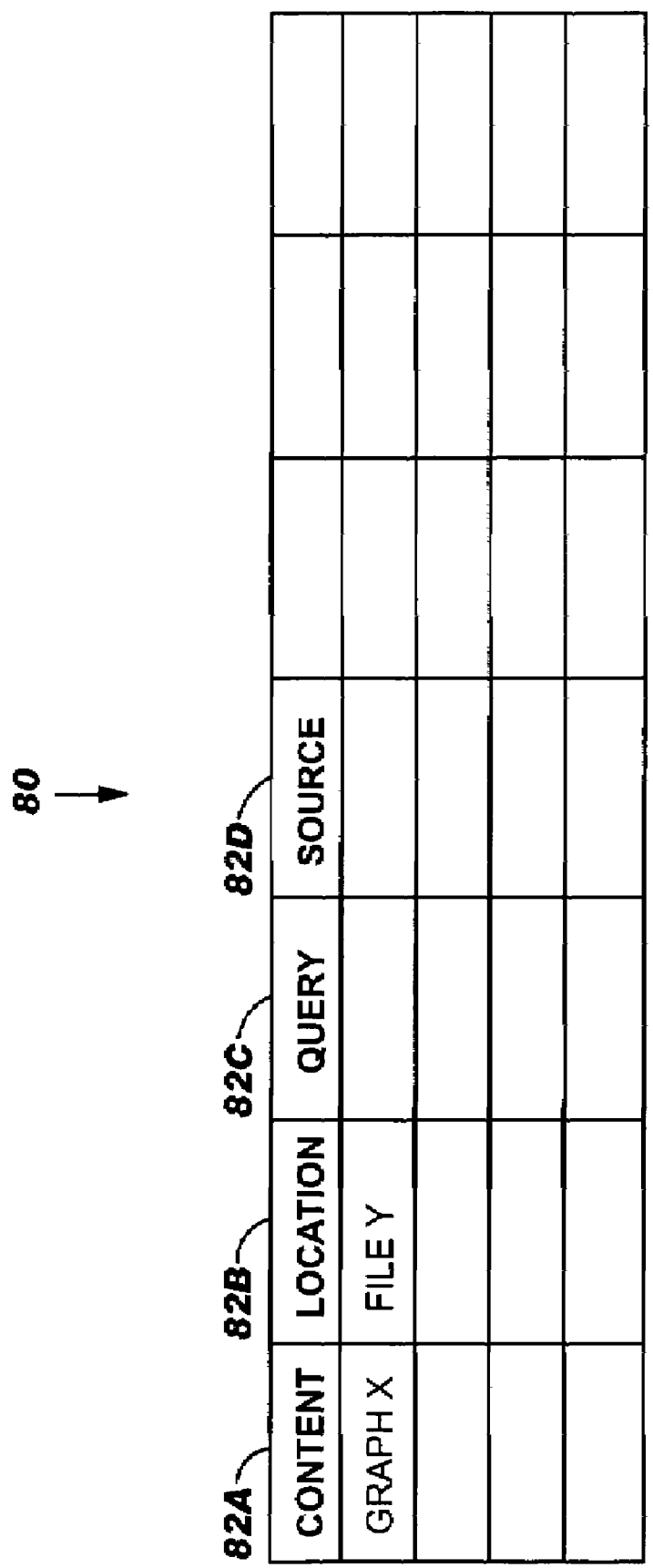
FIG. 5 depicts a table populated with inputted values according to the present invention.

As indicated above, values could be bound to patterns using a table-based approach, as opposed to CPML tags. For example, referring to FIG. 5, an illustrative table 80 is shown. Table becomes populated as developer 52 inputs values. As depicted, table 80 includes columns 82A-D for each needed value. For the example discussed herein, column 82A corresponds to the specific piece of content to be retrieved, while column 82B corresponds to the location from which it will be retrieved. Columns 82C-D pertain to a pattern for querying a data source that was not used by developer 52. To accommodate new patterns, administrator 54 need only add columns to table 80, or create a new table. To this extent, there could be one table that is provided to accommodate all patterns, or each pattern could have its own table.

Referring back to FIG. 2, once the new portlet has been encoded, portlet catalog system 40 will bind the new portlet to the portal server catalog. This binding can be performed dynamically once the portlet is encoded, or based on a deliberate action of developer 52 and/or administrator 54. In either event, the binding allows the new portlet to be visible and apparent to end user 50 when he/she accesses the portal page. End user 50 will not be aware that the portlet doesn't actually exist at this point in time. Rather, when user attempts to use the portlet (e.g., user 50 selected the new portlet on the portal page), instantiator portlet 42 will create an instance 46 of the new portlet and perform its underlying functions. That is, instantiator portlet 42 will retrieve Graph X from File Y for display to end user 50. Thus, although end user 50 is provided with the perception that separate portlet exists, the functions are actually carried out by instantiator or super portlet running in the background. Using this methodology, it is possible to provide an entire portal page having several portlets to end user 50, without actually deploying the several portlets. Rather, the one instantiator portlet 42 can provide any necessary functions without the portal page losing the look and feel of individual portlets.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 6:
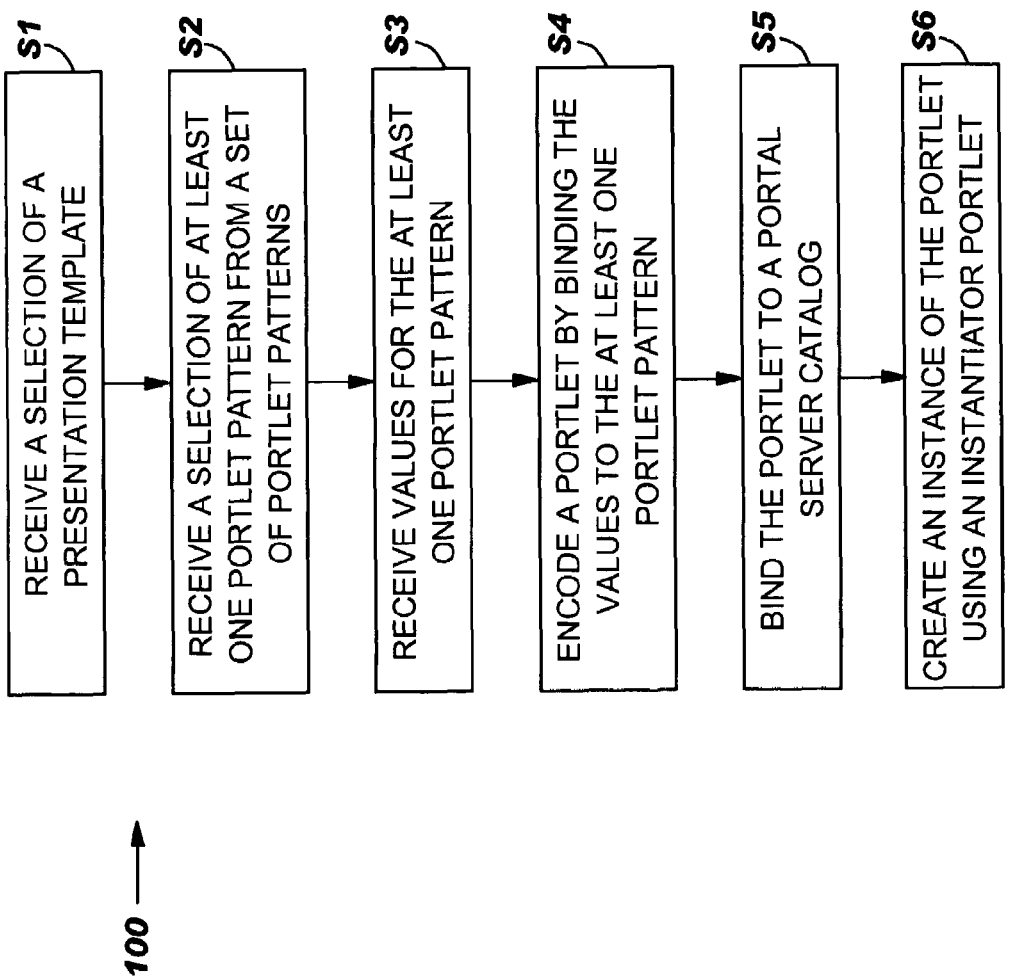
FIG. 6 depicts a method flow diagram, according to the present invention.

Referring now to FIG. 6, a method flow diagram 100 according to the present invention is shown. As shown, first step S1 is to receive a selection of a presentation template. Second step S2 is to receive a selection at least one portlet pattern from a set of portlet patterns. Third step S3 is to receive values for the at least one portlet pattern. Fourth step S4 is to encode a portlet by binding the values to the at least one portlet pattern according to the presentation template. Fifth step S5 is to bind the portlet to a portal server catalog. Sixth step S6 is to create an instance of the portlet using an instantiator portlet.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A model driven portlet development method, comprising:

providing a set of portlet patterns;

encoding a portlet by binding values to at least one of the set of portlet patterns;

binding the portlet to a portal server catalog; and creating an instance of the portlet using an instantiator portlet running on a portal server.

2. The method of claim 1, further comprising selecting a presentation template, wherein the portlet is arranged according to the presentation portlet.

3. The method of claim 1, wherein the set of portlet patterns comprise display from a file source, display from a federated data source, submit data and two way interaction.

4. The method of claim 1, further comprising receiving values prior to the encoding step.

5. The method of claim 1, wherein the binding step comprises dynamically binding the portlet to the portal server catalog.

6. The method of claim 1, wherein the binding step comprises deliberately binding the portlet to the portal server catalog.

7. The method of claim 1, wherein the portlet is encoded using common portlet markup language.

8. The method of claim 1, wherein the values are populated into a table.

9. The method of claim 1, wherein underlying functions of the portlet are performed by the instantiator portlet.

10. The method of claim 1, further comprising designating a window state for the portlet.

11. A model driven portlet development method, comprising:

receiving a selection of a presentation template;

receiving a selection of at least one portlet pattern from a set of portlet patterns;

receiving values for the at least one portlet pattern;

encoding a portlet by binding the values to the at least one portlet pattern according to the presentation template;

binding the portlet to a portal server catalog; and creating an instance of the portlet using an instantiator portlet.

12. The method of claim 11, wherein the portlet is encoded using a common portlet markup language.

13. The method of claim 11, further comprising populating a table with the received values.

14. The method of claim 11, wherein the set of portlet patterns comprise display from a file source, display from a federated data source, submit data and two way interaction.

15. The method of claim 11, further comprising inputting values prior to the encoding step.

16. The method of claim 11, wherein the binding step comprises dynamically binding the portlet to the portal server catalog.

17. The method of claim 11, wherein the binding step comprises deliberately binding the portlet to the portal server catalog.

18. The method of claim 11, further comprising designating a window state, prior to the encoding step, wherein the instance of the portlet will have the designated window state.

19. The method of claim 11, wherein the instance is created upon selection of the portlet on a portal page by an end user.

* * * * *